(12) United States Patent
Poplingher et al.

(10) Patent No.: US 6,871,275 B1
(45) Date of Patent: *Mar. 22, 2005

(54) MICROPROCESSOR HAVING A BRANCH PREDICTOR USING SPECULATIVE BRANCH REGISTERS

(75) Inventors: Mitchell Alexander Poplingher, Campbell, CA (US); Tse-Yu Yeh, Milpitas, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/764,512

(22) Filed: Dec. 12, 1996

(51) Int. Cl.[7] ................................. G06F 9/32
(52) U.S. Cl. ........................................ 712/237
(58) Field of Search ............................. 712/237, 239

(56) References Cited

U.S. PATENT DOCUMENTS

| | | | | |
|---|---|---|---|---|
| 5,394,530 A | * | 2/1995 | Kitta ........................... | 395/587 |
| 5,442,756 A | * | 8/1995 | Grochowski et al. ........ | 395/375 |
| 5,553,255 A | * | 9/1996 | Jain et al. .................... | 395/375 |
| 5,574,871 A | * | 11/1996 | Hoyt et al. ................... | 395/376 |
| 5,606,676 A | * | 2/1997 | Grochowski et al. ........ | 395/586 |
| 5,632,023 A | * | 5/1997 | White et al. ................. | 395/394 |
| 5,666,505 A | * | 9/1997 | Bailey .......................... | 395/383 |
| 5,689,672 A | * | 11/1997 | Witt et al. .................... | 395/389 |
| 5,699,537 A | * | 12/1997 | Sharangpani et al. ........ | 712/217 |
| 5,742,804 A | * | 4/1998 | Yeh et al. .................... | 395/584 |
| 5,748,976 A | * | 5/1998 | Taylor .......................... | 395/587 |
| 6,014,734 A | * | 1/2000 | Tran et al. .................... | 712/23 |
| 6,173,379 B1 | * | 1/2001 | Poplingher et al. ......... | 711/165 |

* cited by examiner

Primary Examiner—David Y. Eng
(74) Attorney, Agent, or Firm—Blakely, Sokokoff, Taylor & Zafman LLP

(57) ABSTRACT

A method and apparatus for speculatively providing a branch target address as specified by an impending branch operation. In one embodiment, a branch prediction unit of the present invention is operable to pre-decode and pre-execute branch operations in a pipestage prior to a decoding stage and an execution stage of a pipelined processor. The branch operations of the present invention are performed via multiple instructions separately scheduled and executed, wherein a first instruction of a branch operation specifies a branch target, and a second instruction of a branch operation specifies when a branch of the branch operation is to occur. In an alternative embodiment of the present invention, the branch prediction unit is further operable to pre-fetch instructions from a memory hierarchy into a local instruction memory device in response to the branch prediction unit pre-decoding a first instruction of a branch operation.

9 Claims, 4 Drawing Sheets

MICROPROCESSOR HAVING A BRANCH PREDICTOR USING SPECULATIVE BRANCH REGISTERS

FIELD OF THE INVENTION

The invention relates to a method and apparatus of a microprocessor performing branch predictions. More specifically, the invention relates to predicting the branch target address of an impending branch operation, based on the branch target address specified by the impending branch operation.

BACKGROUND OF THE INVENTION

Microprocessors often employ the use of pipelining to enhance performance. Within a pipelined microprocessor, the functional units necessary for executing different stages of an instruction are operated simultaneously on multiple instructions to achieve a degree of parallelism leading to performance increases over non-pipelined microprocessors. As an example, an instruction fetch unit, an instruction decode unit and an instruction execution unit may operate simultaneously. During one clock cycle, the instruction execution unit executes a first instruction while the instruction decode unit decodes a second instruction and the fetch unit fetches a third instruction. During a next clock cycle, the execution unit executes the newly decoded instruction while the instruction decode unit decodes the newly fetched instruction and the fetch unit fetches yet another instruction. In this manner, neither the fetch unit nor the decode and execute unit need to wait for the instruction execution unit to execute the last instruction before processing new instructions. In state-of-the-art microprocessors, the steps necessary to fetch and execute an instruction are sub-divided into a larger number of stages to achieve a deeper degree of pipelining.

A pipelined CPU operates most efficiently when the instructions are executed in the sequence in which the instructions appear in memory. Unfortunately, this is typically not the case. Rather, computer programs typically include a large number of branch instructions, which, upon execution, may cause instructions to be executed in a sequence other than as set forth in memory. More specifically, when a branch instruction is encountered in the program flow, execution continues either with the next sequential instruction from memory or execution jumps to an instruction specified at a "branch target" address. Typically the branch specified by the instruction is said to be "Taken" if execution jumps and "Not Taken" if execution continues with the next sequential instruction from memory.

Branch instructions are either unconditional, meaning the branch is taken every time the instruction is executed, or conditional, meaning the branch is taken or not depending upon a condition. Instructions to be executed following a conditional branch are not known with certainty until the condition upon which the branch depends is resolved. However, rather than wait until the condition is resolved, state-of-the-art microprocessors may perform a branch prediction, whereby the microprocessor tries to determine whether the branch will be Taken or Not Taken, and if Taken, to predict the target address for the branch is predicted to be Taken, the microprocessor fetches and speculatively executes the instruction found at the predicted branch target address. The instructions executed following the branch prediction are "speculative" because the microprocessor does not yet know whether the prediction will be correct or not. Accordingly, any operations performed by the speculative instructions cannot be fully completed.

For example, if a memory write operation is performed speculatively, the write operation cannot be forwarded to external memory until all previous branch conditions are resolved, otherwise the instruction may improperly alter the contents of the memory based on a mispredicted branch. If the branch prediction is ultimately determined to be correct, the speculatively executed instructions are retired or otherwise committed to a permanent architectural state. In the case of a memory write, the write operation is normally forwarded to external memory. If the branch prediction is ultimately found to be incorrect, then any speculatively executed instructions following the mispredicted branch are typically flushed from the system. For the memory write example, the write is not forwarded to external memory, but instead is discarded.

A wide variety of techniques have been developed for performing branch prediction. Typically, various tables are provided for storing a history of previous branch predictions along with previous branch targets. However, advanced compiler techniques now permit the same branch instruction to have different branch target addresses, when the branch instruction is repeatedly used in a sequence of instructions. As a result, if a branch prediction unit predicts a branch target address for a branch operation based on a previous branch target for that branch operation, there is a strong chance that the predicted branch target may be incorrect.

Therefore, it is desirable for a method and apparatus that is able to predict branch target addresses for an impending branch operation, based on the branch target address specified by the impending branch operation.

SUMMARY OF THE INVENTION

The present invention provides a method and apparatus for speculatively predicting a branch target address, based on a branch target address specified by an impending branch operation. In one embodiment, a branch prediction unit of the present invention is configured to pre-decode and pre-execute branch operations in a pipestage prior to a decoding stage and an execution stage of a pipelined processor. The branch operations of the present invention are performed via multiple instructions separately scheduled and executed, wherein a first instruction of a branch operation specifies a branch target, and a second instruction of a branch operation specifies when a branch of the branch operation is to occur.

In an alternative embodiment of the present invention, the branch prediction unit is further configured to pre-fetch instructions from a memory hierarchy into a local instruction memory device in response to the branch prediction unit pre-decoding a first instruction of a branch operation.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention provides a method and apparatus for more accurately predicting branch targets of impending branch operations by using the branch target specified by the impending branch operations.

Figure 1:
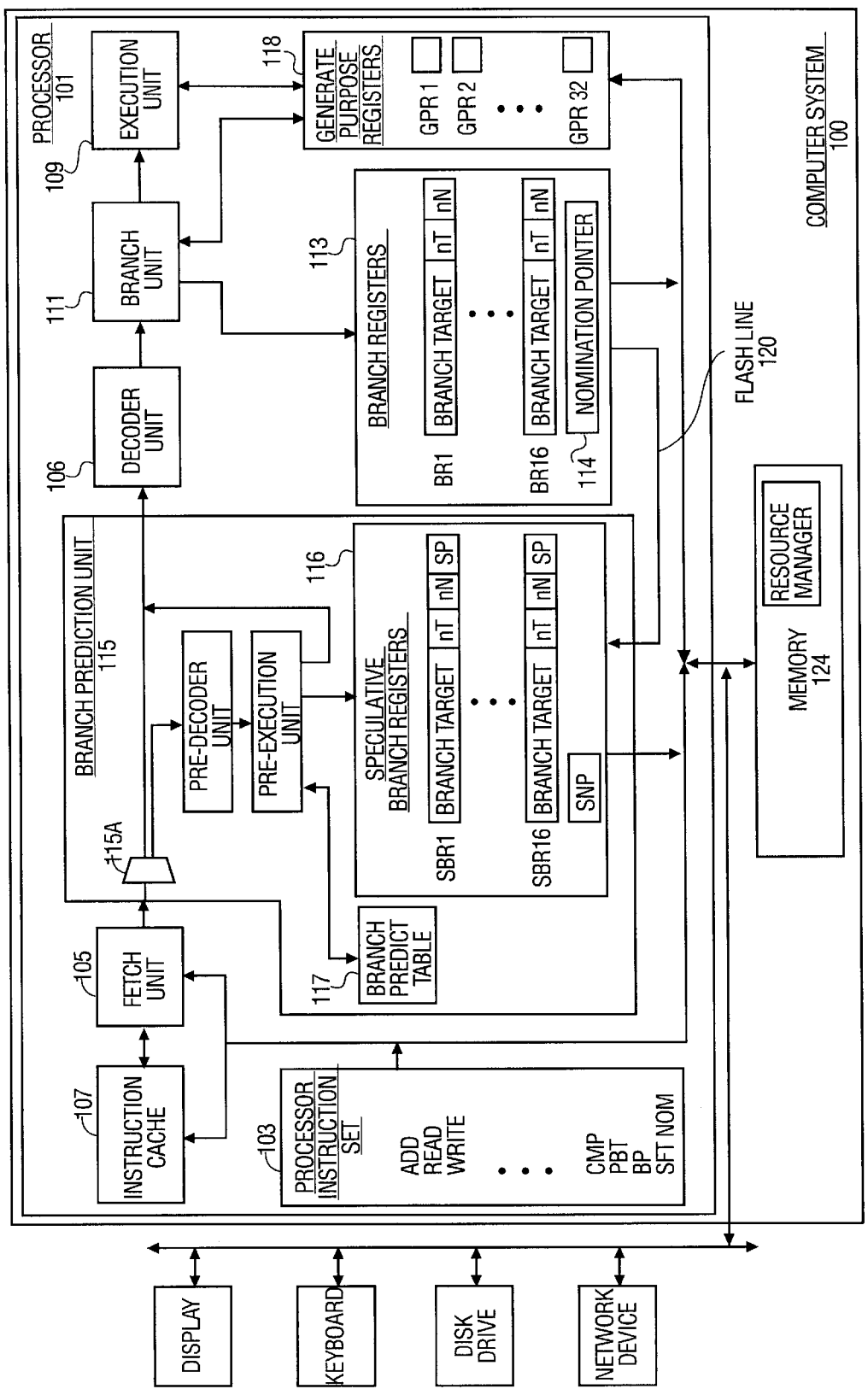
FIG. 1 illustrates an example of a computer system which implements the present invention according to one embodiment.

FIG. 1 is an exemplary computer system 100 implementing one embodiment of the present invention. As shown, the computer system includes a processor 101 for executing instructions and performing other functions to operate the computer system. The processor executes several instructions in parallel in a pipelined configuration, as described in the Background. For example, during a single processor clock cycle, a first instruction may be fetched in one pipe stage, a second instruction decoded in a second pipe stage, and a third instruction executed in a third pipe stage.

The processor, in one embodiment of the present invention, performs branch operations via three separate instructions included in the instruction set of the processor 103. The branch target address of the branch operation is specified by a Prepare To Branch ("PTB") instruction. The branch decision of the branch operation is determined by the results of an integer or floating point Compare ("CMP") instruction. Alternatively, the branch decision can depend on other arithmetic instructions. The actual branch is triggered by a Branch lace ("BP") instruction.

The PTB and the CMP instructions are scheduled to be executed prior to the BP instruction. As a result, the processor is able to begin fetching instructions from the branch target address several instructions/processor clock cycles prior to the actual branching operation to keep the processor full of instructions.

To perform the branch operations, the fetch unit 105, shown in the processor of the present invention, initially fetches a PTB instruction from an instruction cache 107. The fetch unit, thereafter, fetches a CMP instruction, followed by a corresponding BP instruction. The instruction cache of the present invention can be located on the same die area as the processor, or alternatively located external to the processor.

After an instruction is fetched, it is typically decoded by the decoder unit 106, which decodes the instructions into micro-operations specifying an operation to be performed, and operands specifying data to be operated on. The decoded instructions are then executed and the results may then be written to a temporary storage location, such as a register General Purpose Register file ("GPR") 118. For example, a CMP instruction may be executed by the execution unit 109, with the results stored in a GPR register.

In one embodiment, decoded PTB instructions, are executed by a Branch Unit 111. The Branch Unit writes the branch target address, which is specified by the PTB, into a Branch Register file ("BR") 113. Therefore, if the processor is interrupted prior to executing the corresponding BP instruction, the results of the previously executed PTB instructions will be preserved in a Branch register. Data stored in the BRs is considered to be the "architecturally correct state" of a program currently being executed because the instructions that wrote the data to the BRs have actually been executed.

In one embodiment, the Branch Register set 113 includes a Nomination Pointer register 114, which stores a index value in a Branch Register storing the branch target address for the next impending branch operation. In addition to a branch target address, each Branch register includes a nominated taken ("nT") pointer value for when the respective branch is taken and a nominated not taken ("nN") pointer value for when the branch is not taken. The nomination pointer values update the Nomination Pointer register 114 when the respective branch register is read. For example, if BR1 is read and the respective branch is taken, the respective nT value stored in BR1 will replace the value presently stored in the Nomination Pointer register. Otherwise, the nN value stored in BR1 will update the Nomination Pointer Register.

One embodiment of the present invention further includes a Branch Prediction Unit ("BPU") 115 at the front end of the pipe stages to increase the speed and accuracy of predicting branch target addresses. The BPU intercepts certain instructions related to branching operations before they continue to the succeeding pipe stages.

For example, in one embodiment the BPU intercepts, pre-decodes, and pre-executes PTB instructions to "speculatively" determine the branch-target address of the respective impending branch operations. After the BPU has pre-decoded a PTB, the branch target address, specified by the PTB, is stored in a memory device, which is separate from a branch prediction logic provided by the BPU.

In one embodiment, the BPU writes the branch target addresses to a Speculative Branch Register ("SBR") file 116. The SBRs of the BPU are defined to be very similar to the BRs of the Branch Unit. For example, the SBRs include a Speculative Nomination Pointer Register ("SNP"), which, similar to the Nomination Pointer register of the BRs, indexes to the SBRs. The information stored in the SBRs is considered to be speculative because it is updated early in the pipe stages of the processor, before the outcome of previous branch operations are known. In alternative embodiments, other memory devices may be used in place of the SBRs, such as a cache memory device.

The BPU also intercepts, pre-decodes, and pre-executes BP instructions to predict whether the respective branch is taken. In one embodiment, the BPUs prediction logic consist of a Branch Prediction Table ("BPT") 117, which is separate from the SBRs. In alternative embodiments, other devices may be used to predict whether a branch operation is taken or not taken.

Based on the results of the branch prediction, the BPU issues a signal to the SBR presently indexed by the Speculative Nomination Pointer, indicating whether the respective branch is predicted taken. If the branch is predicted to be taken, then the branch target address stored in the indexed SBR is sent to the fetch unit, to begin fetching instructions from the branch target address. Also, the SNP is updated by the nT value stored in the same SBR. If the branch is predicted not taken, the branch target stored in the indexed SBR is disregarded and the SNP is updated by the nN value stored in the same SBR.

By having the BPU predict branch target addresses based on the branch target addresses specified by the PTB instructions, the BPU is able to predict the branch target addresses with a high degree of accuracy. Moreover, by having the BPU predict the branch target address at the front end of the pipe stages, by pre-decoding and pre-executing the PTB instructions, the branch target addresses can be used to begin prefetching instructions at the branch target address much earlier then if the processor waited until the BP instructions were executed by the Branch Unit.

Following the operations of the Branch Prediction Unit, the Branch Unit validates whether the branch predictions was correct. If a misprediction is detected, the processor pipeline is flushed of instructions from the wrong instruction path and the SBRs are updated with the architecturally valid state at the point before the misprediction. In one embodiment, the SBRs are updated by "flash" copying data stored in the BR into the corresponding SBRs via a flash line 120. The processor thereafter, may continue to execute instructions fetched from the correct branch path.

Figure 2A:
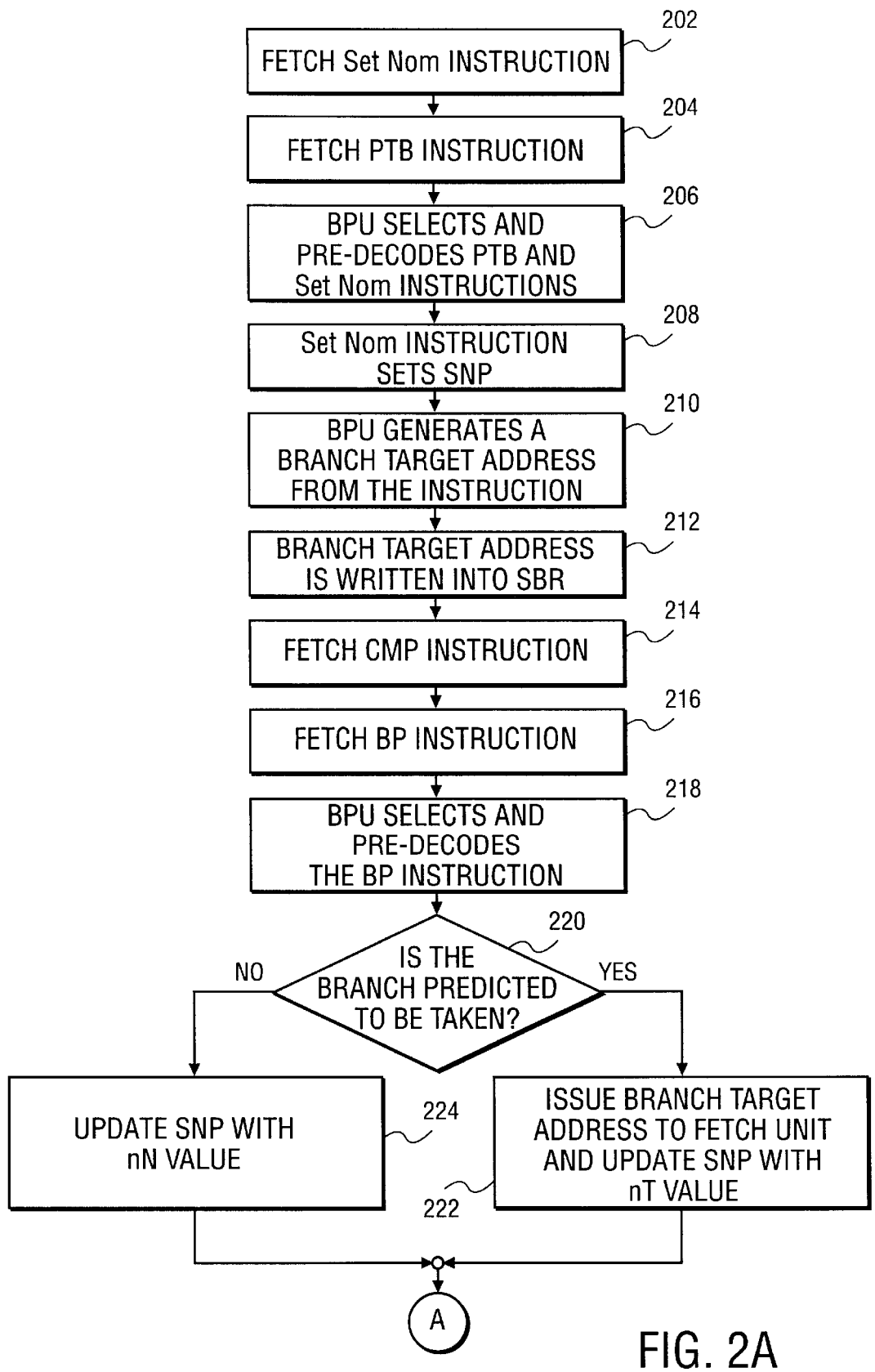
FIG. 2a-2b illustrate a flow diagram describing the steps of the present invention according to one embodiment.
Figure 2B:
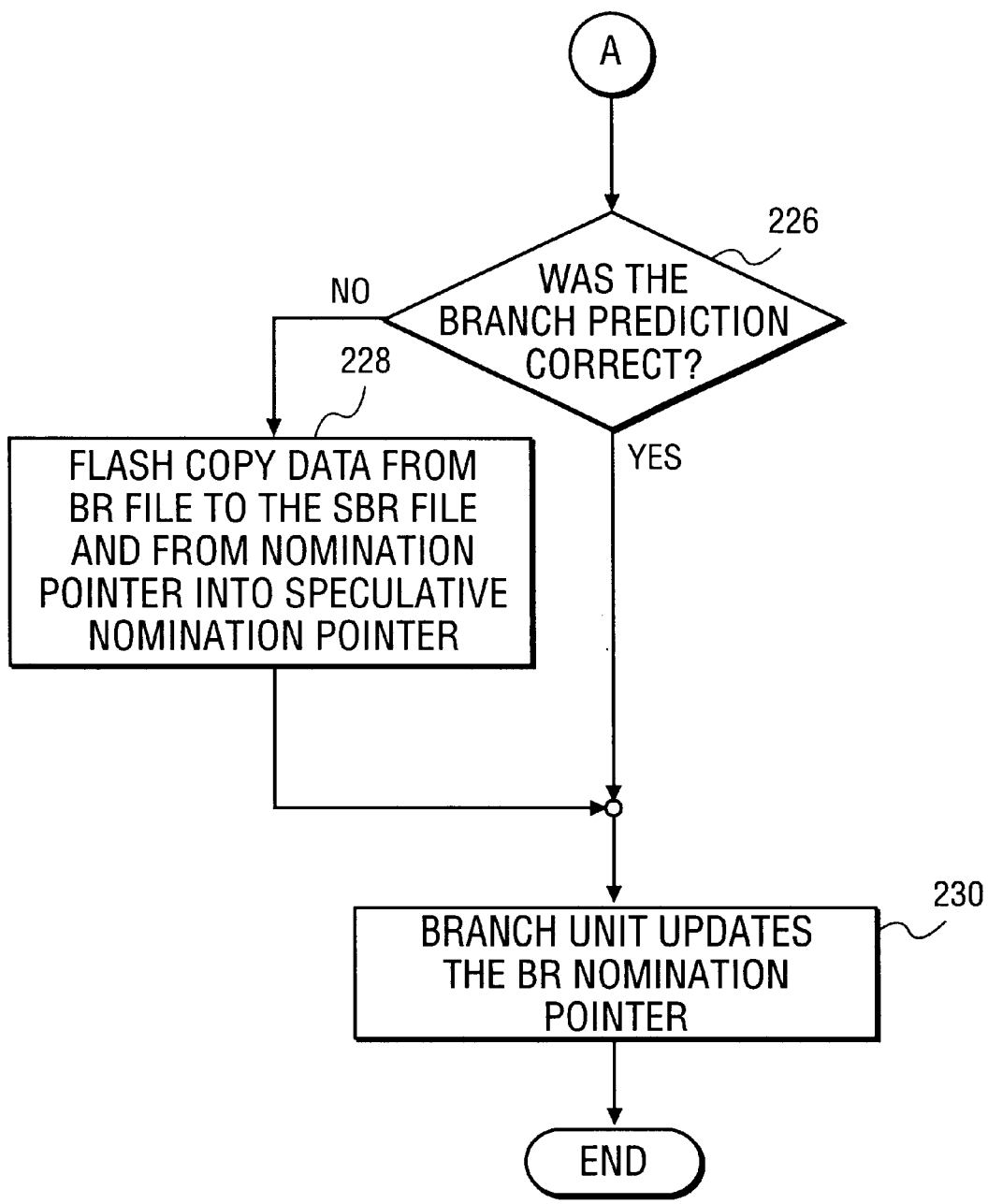

The steps of predicting branch targets addressed in the present invention, are described in additional detail in the flow diagram of FIG. 2. In step 202, a Set Nomination Pointer instruction ("SetNOM") is fetched from the instruction cache by the fetch unit of processor 101. The SetNOM fetched from the instruction cache provides a value to the Speculative Nomination Pointer register to index one of the SBRs, and may also provide a value to the Nomination Pointer to index one of the BRs. In one embodiment, where the SBR file corresponds directly to the BR file, the SetNOM instruction may include one value that can be is used to set the SNP and the Nomination Pointer of the BR file.

In step 204, a PTB instruction is fetched from the instruction cache. In one embodiment, the PTB instruction includes a branch target address, a nN value, a nT value, and a static prediction ("SP") as determined by the compiler. The static prediction is to be used if the branch prediction table of the BPU is unable to provide a dynamic prediction for the respective branch operation.

In one embodiment, data included in the PTB, SetNOM, CMP, and BP instructions, specifying certain SBRs, BRs, or GPRs that are to be read or written to, may be provided to the respective instructions by the computer systems resource manager when program statements of a high level program are compiled into lower level instructions to be executed. The resource manager, in turn, may use a scoreboard to keep track of which registers are in use and which are available.

In step 206, the BPU intercepts the PTB and the SetNom, and pre-decodes the PTB and SetNom instruction. In one embodiment, a multiplexer 115a may be used by the BPU to intercept the PTB and SetNom instructions.

In step 208, the SetNom updates the SNP by writing an index value into the SNP to index one of the SBRs. After pre-decoding the PTB instruction, in step 210 the BPU begins to pre-execute the PTB by generating the branch target address for the respective branch operation. In one embodiment, the PTB includes an offset of the branch target address and the address of the respective PTB. The offset of the branch target address is added to the address of the PTB to generate a branch target address.

In step 212, the data from the decoded PTB instruction is written into the SBR currently indexed by the SNP. In one embodiment, the data written into the SBR from the PTB instruction includes the branch target address, a static prediction, a nN value, and a nT value. Subsequent pre-decoded and pre-executed PTB instructions may continue to update the SBRs, as indexed by the SNP, without having a SetNom instruction change the SNP.

After updating an SBR, the PTB is passed down the pipestages of the processor to the Branch Unit where the PTB is executed to update the BR file. As previously explained, the Branch Unit includes a BR file, which is defined to be very similar to the SBR file. A Nomination Pointer register is also provided, which indexes to the BR storing the branch target address for the next impending branch operation.

In one embodiment, the BRs are each defined to store a branch target address, a nN value, and a nT value. Data stored in the BRs is considered to be the "architecturally valid state" of a program currently being executed because the instructions that have written the data to the BRs have actually been executed.

The BRs are updated similar to the SBRs. For example, an SetNom instruction may initially set, or reset, the Nomination Pointer register to index one of the BR. A decoded PTB instruction then writes a branch targets address, a nN value, and a nT value into the BR currently indexed by the Nomination Pointer. In one embodiment, the data written by a PTB instruction into an SBR and a corresponding BR is the same data.

In step 214, a CMP instruction, corresponding to the most recent PTB instruction, is fetched from the instruction cache. The results of the CMP instruction are to be used as the branch decision. The execution unit executes the CMP instruction and writes the results in a GPR, or alternatively a memory address location.

In step 216, a BP instruction, corresponding to the CMP and PTB instructions, is fetched from the instruction cache. The BP instruction is provided to indicate when the branch operation is to occur. In one embodiment, the processor of the present invention allows at least one fetch clock to pass between fetching a PTB instruction and a corresponding BP instruction.

In step 218, the BPU interprets and pre-decodes the BP instruction. In step 220, the BPU pre-executes the BP instruction by predicting whether a branch operation corresponding to the BP instruction is to be taken. In one embodiment, the memory address of the BP instruction is used to index an entry of the Branch Prediction Table, which will provide a branch prediction for the respective branch operation.

For example, one embodiment of the Branch Prediction Table implements a Two Level Adaptive branch algorithm, commonly known as Yeh's algorithm. This algorithm uses two levels of branch history information to make branch predications: the of the branches; and the branch behavior for a specific pattern of branch history. Alternatively, the Branch Prediction Table may implement an algorithm that uses global or local branch behavior.

Based on the results of the branch prediction provided by the Branch Prediction Table, the BPU issues a signal to the SBR currently indexed by the SNP. In one embodiment, the results of the prediction can be sent as a two bit signal indicating either taken, not taken, or indicating no prediction available.

If the BPU predicts the respective branch is to be taken, in step 222 the branch target address stored in the SBR currently indexed by the SNP is issued to the fetch unit to begin fetching instructions from the branch target address. In addition, the SNP is updated with the nT value stored in the currently indexed SBR. If the BPU predicts the branch is not taken, in step 224 the SNP is updated with the nN value stored in the currently indexed SBR and a branch target address is not issued to the fetch unit.

Alternatively, if a branch prediction is unavailable for the respective branch operation, the SP stored in the currently indexed SBR determines whether respective branch is predicted to be taken. If the SP predicts the branch is taken, then the branch target address is forwarded to the fetch unit and the nT value updates the SNP. Otherwise, no branch target is forwarded to the fetch unit and the SNP is updated with the nN value.

After predicting whether the branch is taken, the BPU appends the results of the prediction to the BP instruction, and the BP instruction is passed down the pipe stages to the Branch Unit. In step 226, the Branch Unit receives the BP instruction and verifies whether the branch prediction is correct. In one embodiment, the Branch Unit verifies whether the branch prediction is correct by first reading the BP instruction, which indicates where the results of the corresponding CMP instruction should have been stored and the expected results of the CMP instruction that indicate the branch is to be taken. The Branch Unit then compares the results of the CMP instruction with the expected results as specified by the BP instruction.

The Branch Unit then compares the results of the BPU's branch prediction, as appended to the BP instruction, to the Branch Unit's determination of whether the respective branch is actually to be taken, as based on the results of the corresponding CMP instruction. If the BPU's branch prediction was incorrect, in step 228 the Branch Unit updates the SBRs with the architectually correct state at the point before the misprediction by copying data stored in the BRs into the corresponding SBRs, via the flash line 120, and copying the BR's Nomination Pointer into the SNP of the SBR. The Branch Unit also flushes the pipeline stages, which are filled with the instructions from the wrong instruction path. Afterwards, the BPU may continue to speculatively perform branch predictions along the correct branch path.

In step 230, the Branch Unit issues a signal to the BR currently indexed by the Nomination pointer of the BRs. The signal indicates the architectually correct results of whether the respective branch is to be taken. If the signal indicates the branch is to be taken, the BR Nomination Pointer is updated with the nT value stored in the currently indexed BR. On the other hand, if the signal indicates the branch is not taken, the Nomination Pointer is updated with the nN value of the currently indexed BR. As a result, the architectually correct state of the branch paths for the instructions currently being executed is maintained in the BR file.

In the foregoing specification the invention has been described with reference to specific exemplary embodiments thereof. It will, however, be evident that various modifications and changes may be made thereto without departing from the broader spirit and scope of the invention.

For example, the PTB instruction could be executed under the control of predicate execution. For example, the results of the CMP instruction could set a predicate register (e.g., set the predicate register to one if the branch is to be taken, and set the predicate register to zero if the branch is not to be taken). The BRs could then each include an additional field indexing to a predicate register, which, based on the results of the CMP instruction, indicates whether the respective branch is to be taken. The field of the BR register indexing the predicate registers could be updated by the PTB instruction. The BP instruction could be a single bit instruction, which when received by the Branch Unit, would cause the Branch Unit to read the predicate register indexed by the currently indexed BR, to determine whether the impending branch is to be taken.

Figure 3:
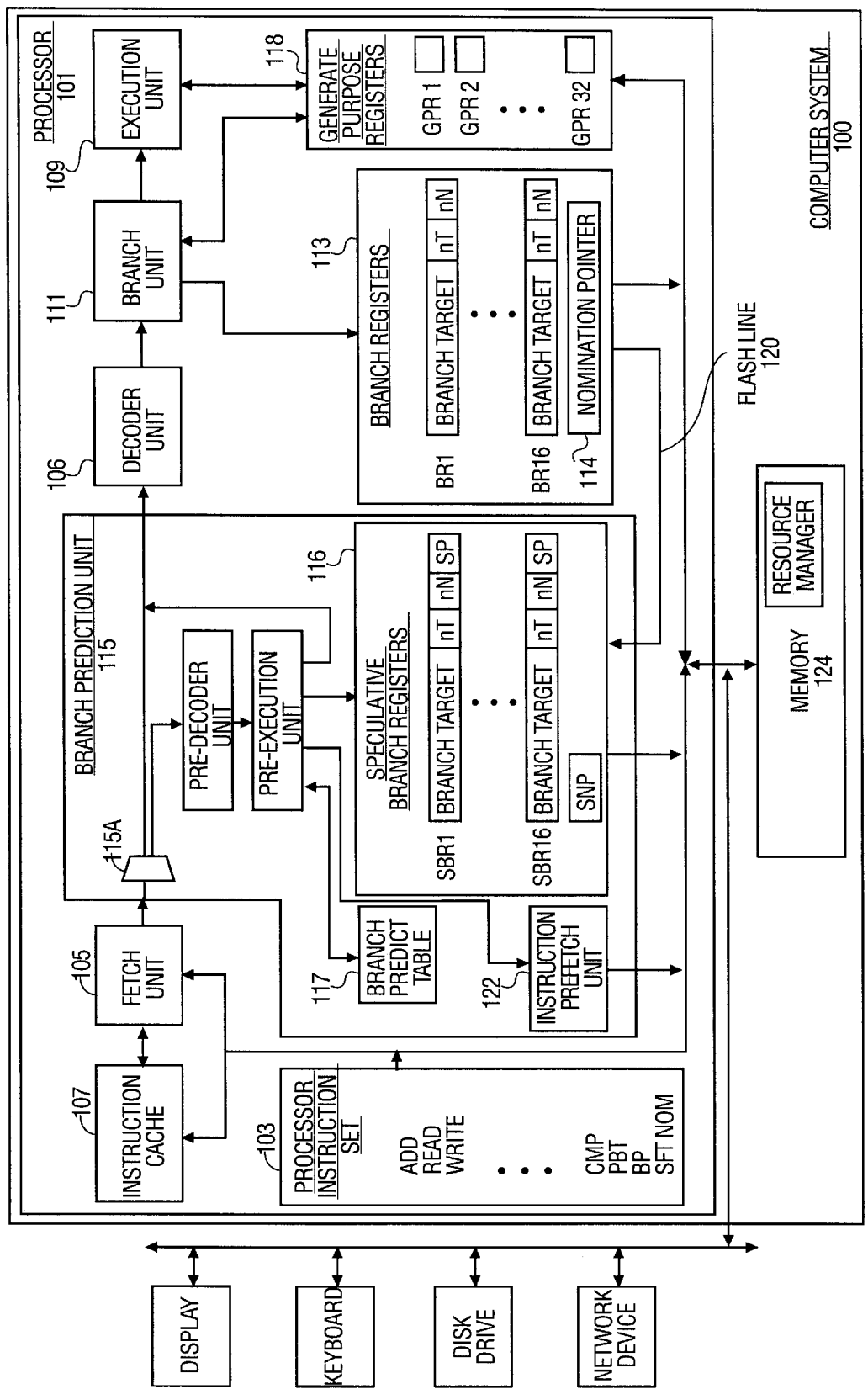
FIG. 3 illustrates an example of a computer system which implements the present invention according to an alternative embodiment.

In another alternative embodiment, the PTB instructions of the present invention may also be used to begin "prefetching" instructions from the memory hierarchy into the instruction cache before the Fetch Unit attempts to fetch the instructions from the instruction cache. For example, in one embodiment, after a PTB instruction has been fetched and pre-decoded by the BPU, if the static prediction of the PTB indicates the branch is taken, a copy of the branch target address provided by the PTB instruction is sent to the Prefetch Unit 122, shown in FIG. 3. The branch target address is then compared to the contents of the instruction cache. If the instructions are not found, the Prefetch Unit begins prefetching instructions at the branch target address from an external memory device 124 into the instruction cache.

Furthermore, the present invention could alternatively be implemented using a single branch instruction to perform the branch operations of the present invention. The single branch instruction could include the branch condition and the branch target address. The single branch instruction could be pre-decoded and pre-executed by the Branch Prediction Unit. Depending on a prediction of the branch condition, the Branch Prediction Unit could begin fetching instructions from the branch target address specified in the single branch instruction.

What is claimed is:

1. A method comprising:
   a branch prediction unit (BPU) speculatively, prior to resolution of a previously predicted branch operation, predicting a branch target address of a first branch operation consisting of multiple separate instructions;
   storing the speculatively predicted branch target address in a speculative branch register (SBR) set, the SBR set is defined to correspond to a separate branch register (BR) set;
   the BPU speculatively predicting whether the first branch operation is taken, and if speculatively predicted to be taken, using the speculatively predicted branch target address in the speculative branch register set to fetch a subsequent instruction;
   a Branch unit (BU), subsequent to the BPU, determining if the first branch operation is to be taken; and
   if the speculative prediction of the first branch operation is incorrect, copying data from the BR into the SBR.

2. The method of claim 1, wherein the first branch operation consists of at least two instructions including a first instruction of the first branch operation specifies a branch target, and a second instruction of the first branch operation specifies when a branch of the first branch operation is to occur.

3. The method of claim 2 further including the BU determining a branch target of the first branch operation; and
   The BU storing the branch target of the first branch operation in the BR.

4. The method of claim 3 further including: a
   speculative nomination pointer indexing to a branch target address stored in the SBR, which corresponds to an impending branch operation, and
   a nomination pointer indexing to a branch target address stored in the BR, which corresponds to an impending branch operation.

5. A processor comprising
   a branch prediction unit (BPU) to speculatively, prior to resolution of a previously predicted branch operation, predict a branch target address of a first branch operation consisting of multiple separate instructions,
   the BPU to store the speculatively predicted branch target address in a speculative branch register (SBR) set, the SBR set is defined to correspond to a separate branch register (BR) set,
   the BPU to speculatively predict whether the first branch operation is taken, and if speculatively predicted to be taken, the BPU to use the speculatively predicted branch target address in the speculative branch register set to fetch a subsequent instruction; and
   a Branch unit (BU), subsequent to the BPU, to determine if the first branch operation is to be taken, and if the speculative prediction of the first branch operation is incorrect, the BU to copy data from the BR into the SBR.

6. The processor of claim 5, wherein the first branch operation consists of at least two instructions including a first instruction of the first branch operation specifies a branch target, and a second instruction of the first branch operation specifies when a branch of the first branch operation is to occur.

7. The processor of claim 6, wherein the BU is to determine a branch target of the first branch operation; and The BU is to store the branch target of the first branch operation in the BR.

8. The processor of claim 7 further including:

a speculative nomination pointer of the SBR to index to a branch target address stored in the SBR, which corresponds to an impending branch operation, and a nomination pointer of the BR to index to a branch target address stored in the BR, which corresponds to an impending branch operation.

9. A system comprising:

A memory;

A network connection; and

A processor having a branch prediction unit (BPU), a decoder, a branch unit (BU), and an execution unit, The BPU to speculatively, prior to resolution of a previously predicted branch operation, predict a branch target address of a first branch operation consisting of multiple separate instructions, the BPU to store the speculatively predicted branch target address in a speculative branch register (SBR) set, the SBR set is defined to correspond to a separate branch register (BR) set, the BPU to speculatively predict whether the first branch operation is taken, and if speculatively predicted to be taken, the BPU to use the speculatively predicted branch target address in the speculative branch register set to fetch a subsequent instruction, the Branch unit (BU), subsequent to the BPU, to determine if the first branch operation is to be taken, if the speculative prediction of the first branch operation is incorrect, the BU to copy data from the BR into the SBR.

* * * * *

UNITED STATES PATENT AND TRADEMARK OFFICE
CERTIFICATE OF CORRECTION

PATENT NO. : 6,871,275 B1
DATED : March 22, 2005
INVENTOR(S) : Poplingher et al.

It is certified that error appears in the above-identified patent and that said Letters Patent is hereby corrected as shown below:

Column 1,
Line 62, after "branch", insert -- . If the branch --.

Column 3,
Line 26, delete "lace" and insert -- place --.

Column 6,
Line 31, after "branch", insert -- prediction --.
Line 34, after "predications: the", insert -- history --.

Signed and Sealed this

Nineteenth Day of July, 2005

JON W. DUDAS
*Director of the United States Patent and Trademark Office*